United States Patent
Bello et al.

(10) Patent No.: US 7,757,052 B2
(45) Date of Patent: Jul. 13, 2010

(54) APPARATUS, SYSTEM, AND METHOD FOR OPTIMIZING RECALL OF LOGICAL VOLUMES IN A VIRTUAL TAPE SERVER

(75) Inventors: Keith Anthony Bello, Oro Valley, AZ (US); Cheryl Marie Friauf, Tucson, AZ (US); Gregory Tad Kishi, Oro Valley, AZ (US); Mark Allan Norman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 11/029,322

(22) Filed: Jan. 5, 2005

(65) Prior Publication Data

US 2006/0149898 A1 Jul. 6, 2006

(51) Int. Cl.
G06F 12/00 (2006.01)
G06F 13/00 (2006.01)
G06F 13/28 (2006.01)

(52) U.S. Cl. .................................................. 711/154
(58) Field of Classification Search .................. 711/154
See application file for complete search history.

(56) References Cited

U.S. PATENT DOCUMENTS

| | | | | |
|---|---|---|---|---|
| 4,771,375 A * | 9/1988 | Beglin et al. | ................. | 711/111 |
| 5,581,729 A * | 12/1996 | Nishtala et al. | .............. | 711/143 |
| 5,594,883 A | 1/1997 | Pricer | .......................... | 395/440 |
| 5,657,472 A * | 8/1997 | Van Loo et al. | .............. | 711/158 |
| 5,684,977 A * | 11/1997 | Van Loo et al. | .............. | 711/143 |
| 5,974,427 A * | 10/1999 | Reiter | ......................... | 707/203 |
| 6,023,709 A | 2/2000 | Anglin et al. | ................ | 707/204 |
| 6,029,179 A | 2/2000 | Kishi | ......................... | 707/202 |
| 6,134,629 A * | 10/2000 | L'Ecuyer | .................... | 711/110 |
| 6,279,074 B1 * | 8/2001 | Pence | ......................... | 711/112 |
| 6,507,883 B1 * | 1/2003 | Bello et al. | ..................... | 711/4 |
| 6,745,212 B2 | 6/2004 | Kishi et al. | .................. | 707/204 |
| 7,058,736 B2 * | 6/2006 | Garcia et al. | ................... | 710/35 |
| 2003/0014568 A1 | 1/2003 | Kishi et al. | ..................... | 710/4 |
| 2003/0056034 A1* | 3/2003 | Olds et al. | ...................... | 710/5 |
| 2003/0158996 A1* | 8/2003 | Espeseth et al. | .............. | 711/112 |
| 2003/0217043 A1* | 11/2003 | Weiss et al. | ..................... | 707/2 |
| 2003/0236942 A1* | 12/2003 | Kishi et al. | .................. | 711/113 |
| 2004/0044828 A1 | 3/2004 | Gibble et al. | ................... | 711/4 |
| 2004/0123055 A1* | 6/2004 | Solomon et al. | ............ | 711/156 |
| 2006/0161737 A1* | 7/2006 | Martin et al. | ................ | 711/147 |
| 2007/0028058 A1* | 2/2007 | Bradley et al. | .............. | 711/154 |

* cited by examiner

*Primary Examiner*—Matt Kim
*Assistant Examiner*—Christopher D Birkhimer
(74) *Attorney, Agent, or Firm*—Kunzler Needham Massey & Thorpe

(57) ABSTRACT

An apparatus, system, and method are disclosed for recalling a logical volume from a mountable media for use in a virtual tape server. The apparatus includes a receiving module, a queuing module, and an optimizer module. The receiving module receives recall requests for logical volumes stored in a mountable media such as a tape cartridge. The queuing module places the requests in a queue to be processed in turn. The optimizer module reorders the queue based on one or more optimization rules in order to process the recall requests more efficiently.

16 Claims, 7 Drawing Sheets

APPARATUS, SYSTEM, AND METHOD FOR OPTIMIZING RECALL OF LOGICAL VOLUMES IN A VIRTUAL TAPE SERVER

BACKGROUND OF THE INVENTION

1. Field of the Invention

This invention relates to recalling logical volumes in a virtual tape server and more particularly relates to optimizing a plurality of recall requests for logical volumes through the application of optimization rules to the queue of recall requests to be processed.

2. Description of the Related Art

Data Processing systems typically require large amounts of data storage capacity, some of which is needed quickly and may be stored in memory and hard disk drives, and other of which is not immediately required.

As an example, data not immediately required may comprise data that is infrequently accessed, and the storage of the data may be in the form of logical volumes of data stored on removable re-writable physical media volumes, such as magnetic tape or optical disk, and the physical media volumes may be written and/or read by means of a data storage drive.

If large amounts of data are to be stored and then accessed on occasion, virtual tape servers (VTS) backed by automated data storage libraries are often employed. Such libraries provide efficient access to large quantities of data stored on physical media volumes, which are stored in storage shelves and which are accessed by one or more accessors and delivered to data storage drives in the library.

A request by a host data processing system to create or modify a logical volume is issued to a VTS. If the request requires access to a physical media volume that contains the requested logical volume, the VTS instructs its attached library to access the physical media volume from the storage shelf, then mount the physical media volume at a desired data storage drive. The logical volume is read to cache storage, which may comprise hard disk drives or other high-speed storage, so that it may be immediately accessed and provided to the host system.

If the request is for a logical volume that is already in cache, or is for a logical volume that will be completely rewritten, referred to here in as a scratch mount, a physical media volume access is not required. The host system then reads from or writes to the logical volume in the cache, via the VTS. When the host system closes the logical volume, the logical volume remains in cache storage so that it can be immediately re-accessed.

The cache storage is typically limited in capacity, requiring that the updated logical volumes be migrated back in storage, comprising the physical media volumes, so as to free space in the cache storage. Typically a least recently used, or LRU, algorithm is employed to migrate logical volumes out of cache storage to backing storage.

Recalling and copying a migrated logical volume requires that the physical media volume contain the migrated logical volume be mounted on a data storage drive, so that the logical volume may be recalled into cache storage, re-accessed and copied.

A method and apparatus for recalling logical volumes to cache from physical media volumes for redundant storage in automated data storage libraries is set forth in U.S. Pat. No. 6,507,883, which is incorporated here in by reference in its entirety.

Volume mapping is used to create a correlation between the physical capacity of a storage cartridge (stacked volume or physical volume) and the data storage unit size (virtual volumes or logical volumes) of a file or block that is stored on the cartridge. Given the available data storage capacity of a disk, such mapping allows multiple logical volumes to be stored on a single physical volume, hence providing an efficient use of the available storage media. A virtual tape server (VTS) is one device capable of creating and maintaining such mapping among physical volumes and logical volumes.

A typical VTS has a small number of physical drives that can be used for recalling virtual volumes. The VTS has many more virtual devices, for example 256, that provide access to the virtual volumes. There are times on a VTS where more virtual devices access virtual volumes that are not in cache than there are physical drives to mount the physical tapes. When this occurs, the additional recalls are queued for processing, generally in a first in- first out queue. In general, these queued recalls arrive in an order that, when processed in a first in-first out order, will require a load/un- load cycle per logical volume recalled.

One problem with some known VTS Systems is that recalling logical volumes from a physical media can be time consuming. For example, on a busy VTS, some or all the drives are mounted or loaded with physical media such as cartridges. When a recall is requested the cartridge or physical tape must be unloaded or dismounted from the physical drive. This process can take upwards of one minute. Another minute may be spent loading the next physical tape into the physical tape drive and locating the tape to the start of the virtual volume. Another minute may be spent transferring the virtual volume from the physical tape or other mountable media to the VTS cache. In general, the majority of the time spent recalling a virtual volume from tape is spent loading and unloading the physical tape cartridge.

Thus, it would be an advancement in the art to provide a virtual tape system and method that increases the efficiency of requesting recalls. It would be a further advancement in the art to provide such a virtual tape server capable of achieving greater efficiency without making the requester wait too long for any particular request. It would be yet another advancement in the art to provide such a virtual tape server capable of efficiently requesting recalls without overly penalizing any one recall requests. It would be an additional advancement in the art to provide such a virtual tape system that minimized virtual tape resources when requesting recalls. Such a virtual tape server is disclosed and claimed herein.

SUMMARY OF THE INVENTION

The present invention has been developed in response to the present state of the art, and in particular, in response to the problems and needs in the art that have not yet been fully solved by currently available virtual tape servers. Accordingly, the present invention has been developed to provide an apparatus, system, and method for optimizing recall requests for logical volumes in a virtual tape server that overcome many or all of the above-discussed shortcomings in the art.

The apparatus to recall logical volumes is provided with a logic unit containing a plurality of modules configured to functionally execute the necessary steps of receiving recall request, placing recall requests in a queue, and optimizing the processing of the queue.

In one embodiment, the apparatus may be configured to optimize the processing of the queue by reordering the queue in accordance with one or more optimization rules. One or more requests for logical volumes residing on one mountable media, such as a disk cartridge, could be grouped or processed sequentially on a single drive, regardless of whether the recall requests for these logical volumes were originally received sequentially.

The apparatus may be further configured to process a first recall request based upon the status a second recall request. The optimizer module may apply optimization rules to the processing of the queue, but may cease optimization if the status of a particular recall request shows that it has waited too long to be processed.

A system of the present invention is also presented to recall logical volumes. The system may be embodied in a cache system including a processor, a drive unit, and a tape library. The tape library may provide logical volumes stored on mountable media to cache. In one embodiment, the processor is coupled to a processor cache configured to store a logical volume.

The system may further include memory containing modules for execution on the processor. In one embodiment, the memory contains a receiving module for receiving one or more recall requests directed to logical volumes found on mountable media such as disk cartridges. The memory may also include a queue module for placing each recall request in a queue for processing. The memory may also include an optimizer module that applies optimization rules to the processing of the recall requests in queue.

A method of the present invention is also presented for recalling logical volumes. The method in the disclosed embodiments substantially includes the steps necessary to carry out the functions presented above with respect to the operation of the described apparatus and system. In one embodiment, the method includes receiving a plurality of recall requests for logical volumes stored in a mountable media. The method also may include placing each recall request in a queue for processing and applying at least one optimization rule to reorder the requests in the queue for processing.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
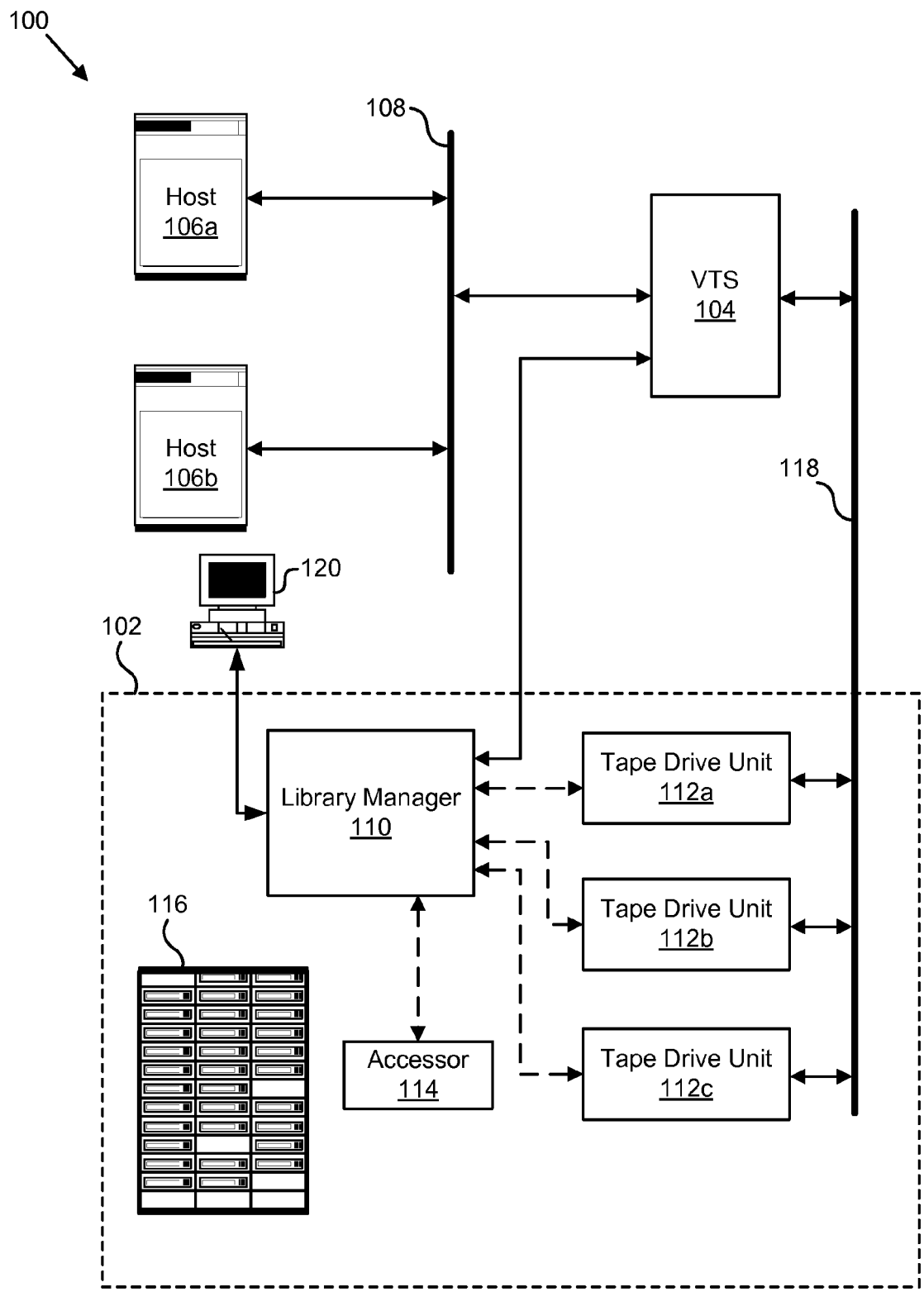
FIG. 1 is a schematic block diagram illustrating one embodiment of a virtual tape system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates a schematic block diagram of one embodiment of a representative virtual tape system 100, in accordance with the present invention. The system 100 includes an automated library unit 102, at least one VTS 104, and at least one host 106. Each host 106 may be a mainframe computer. Alternatively, the hosts 106 may be servers or personal computers using a variety of operating systems. The host 106 and the VTS 104 are connected via a storage area network (SAN) 108 or another suitable communications channel, for example, an Enterprise System Connection (ESCON) channel used in IBM mainframe computers.

The automated tape library unit 102 includes a library manager 110, one or more data drive devices, which may be tape drive units 112, an accessor 114, and a plurality of mountable media 116. In one embodiment, the mountable media includes tape cartridges, magnetic disks, optical disks, CDs, DVDs, other devices that can store data and be mounted to a drive unit, and the like. The library manager 110, which includes at least one computing processor, is interconnected with and controls the actions of the tape drive units 112 and the accessor 114. The configuration of the library manager 110 will be shown and described in greater detail below.

In FIG. 1, three tape drive units 112a, 112b, and 112c are shown. The present invention is operable with one or more tape drive units 112. The tape drive units 112 may share one single repository of mountable media 116. Alternatively, the tape drive units 112 may utilize multiple repositories of mountable 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the VTS 104 and the tape drive units 112 via a network 118, which may be a storage area network, (SAN), local area network (LAN), wide area network (WAN), or another suitable type of network, including the Internet or a direct connection between the VTS 104 and the tape drive units 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and a tape drive unit 112. The accessor 114 typically includes a gripper and a bar code scanner, or a similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the mountable media 116 may include magnetic media, optical media, or any other removable media corresponding to the type of drive employed.

A control console 120 is connected to the library manager 110. The control console 120 may be a computer in communication with the library manager 110 so that a user can control the operating parameters of the tape library unit 102 independently of the host 106.

Figure 2:
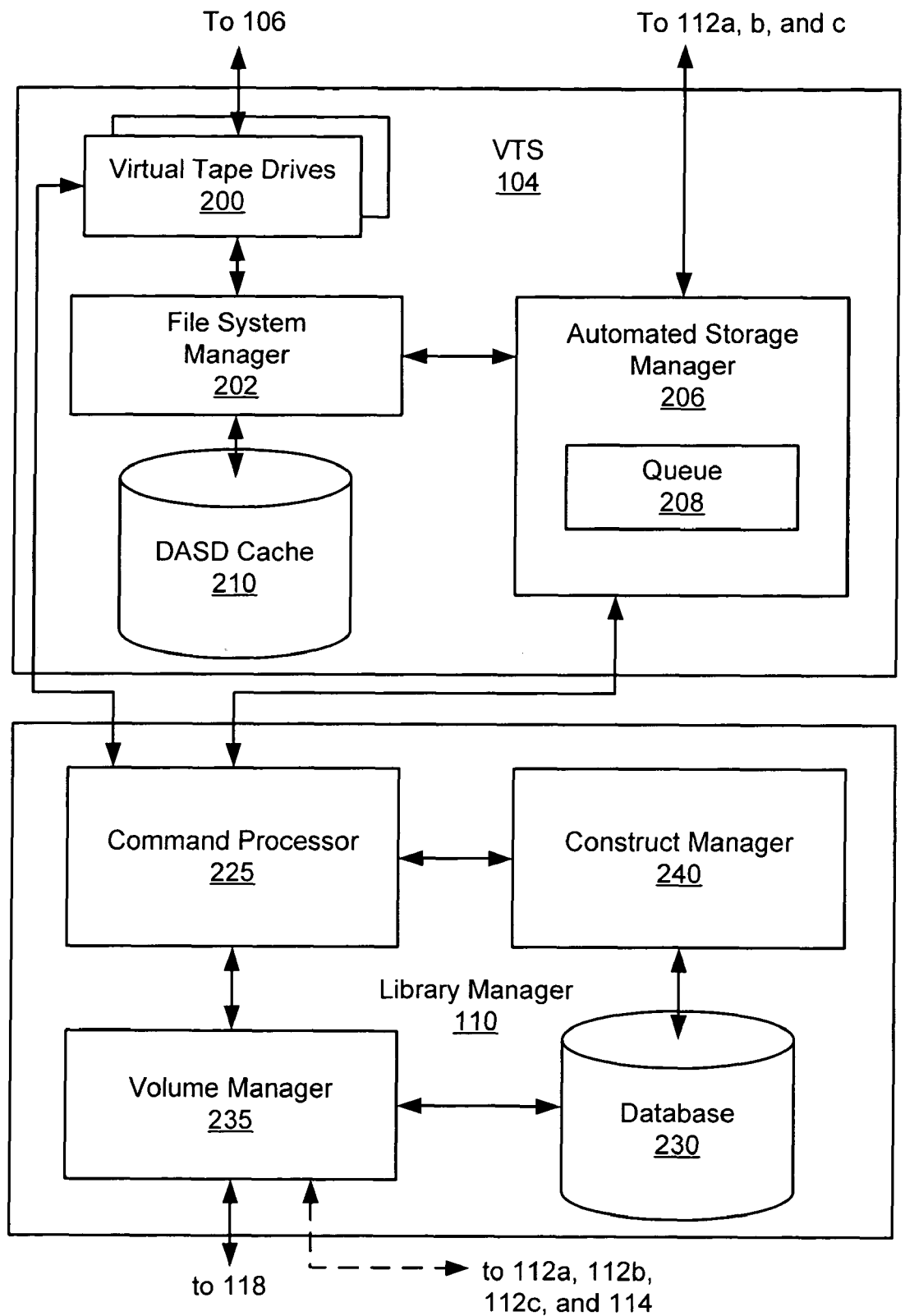
FIG. 2 is a schematic block diagram illustrating one embodiment of a virtual tape server (VTS) and one embodiment of a library manager suitable for use with the virtual tape system of FIG. 1.

FIG. 2 illustrates a schematic block diagram depicting one embodiment of the VTS 104 and one embodiment of the library manager 110 of FIG. 1. The VTS 104 and the library manager 110 may each take the form of a computer with a bus, processor, memory, and the like. These elements have been omitted from FIG. 2 to more clearly depict the various executable modules and data blocks of the VTS 104 and the library manager 110 pertinent to the invention. There could also be other executable modules and data blocks known in the art in implementing a VTS or library manager, but are omitted to focus on the elements essential to the invention.

As shown, the VTS 104 includes a plurality of virtual tape drives 200, a file system manager 202, an automated storage manager 206, a queue 208, and at least one direct access storage device (DASD) cache 210. The DASD cache 210 temporarily stores data from the host 106 on virtual or logical volumes in the form of files, and may thus be referred to as a "cache." A write command from the host 106 is processed by the VTS 104, through a virtual tape drive 200 into the DASD cache 210, prior to transferring the updated logical volume from the DASD cache 210 to the mountable media or physical volume 116 (FIG. 1). According to one example, the DASD cache 210 takes the form of one or more hard disk drives, which may be arranged in a redundant array of independent drives (RAID configuration), such as RAID 5. The virtual tape drives 200 also process control commands from host 106.

The file system manager 202 manages and coordinates data storage in the DASD cache 210. The automated storage manager 206 controls the interface communications between the file system manager 202 and the tape drive units 112. The automated storage manager 206 also controls communications between the VTS 104 and the library manager 110. In one embodiment, the host 106 will request a particular logical volume. The automated storage manager 206 determines whether the logical volume is in the DASD cache 210. If it is not, the automated storage manager 206 requests a recall for it from the physical volume or mountable media 116. The automated storage manage 206 may also contain a queue 208 for temporarily placing additional recall requests to be processed. Thus, the automated storage manager 206 is an apparatus for recalling logical volumes from mountable media 116 by means of the tape drives 112a, b, c (FIG. 1).

The library manager 110 manages the virtual and physical volumes as well as the constructs. More specifically, the library manager 110 includes the command processor 225 that receives control commands from the virtual tape drives 200 and the automated storage manager 206. The command processor 225 passes instructions about the management of the virtual and physical volumes to the volume manager 235. The volume manager 235 stores information about the virtual and physical volumes on a database 230 of the library manager 110. In addition, depending on the instructions received, the volume manager sends instructions to the tape drive units 112 and/or the accessor 114 to load or "mount" the cartridges or other mountable media 116 on which copies of the virtual volume are to be made or retrieved. Mounting of multiple cartridges 116 may be generally simultaneous or in a certain order, depending on the configuration of the accessor 114 and the tape drive units 112.

The library manager 110 also has a construct manager 240 that receives user instructions from the control console 120 regarding the volume management actions to be followed for a given construct name. The volume management actions are stored and retrieved by the construct manager 240 on a database 230 of the library manager 110. For certain control commands received by the command processor 225, the command processor 225 instructs the construct manager 240 to provide the volume management actions for a specific virtual volume. The command processor 225 then passes the returned volume management actions for a specific virtual volume to the automated storage manager 206.

Figure 3:
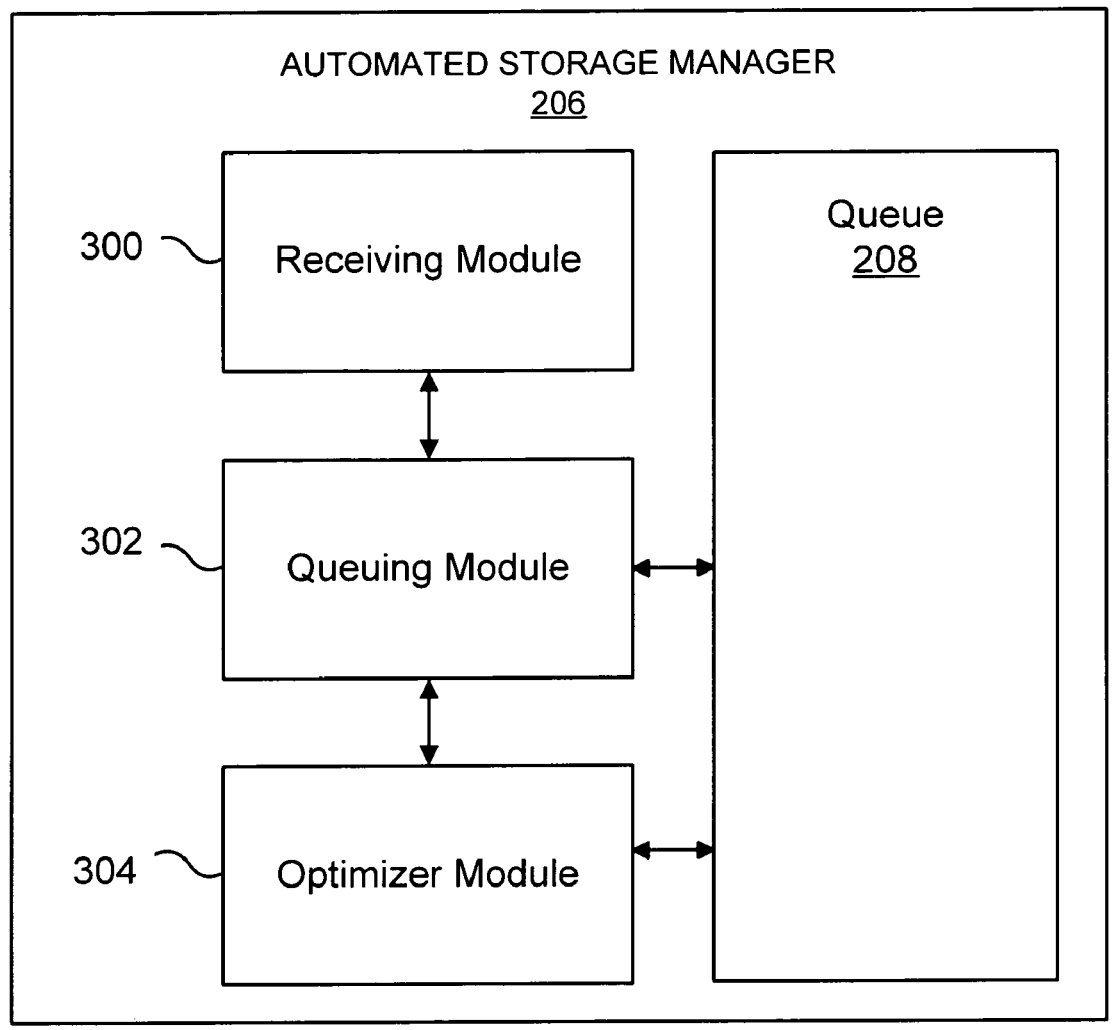
FIG. 3 is a schematic block diagram illustrating one embodiment of an automated storage manager suitable for use with the virtual tape system of FIG. 1.

FIG. 3 illustrates a schematic block diagram of one embodiment of an automated storage manager 206 according to the present invention. The system of the present invention may reside in memory executable on a processor. The automated storage manager 206 may reside in such memory and contain modules for execution on the processor. In one embodiment, the automated storage manager 206 may contain a receiving module 300 configured to receive a plurality of recall requests directed to a logical volume stored on the mountable media 116. The automated storage manager 206 may also contain a queuing module 302 configured to place each recall request in the queue 208 for processing. The automated storage manager 206 also includes an optimizer module 304. The optimizer module 304 operates to apply at least one optimization rule to the processing of recall requests in the queue 208.

In one embodiment of the present invention, the apparatus 206 reorders the queue 208 in order to optimize the efficiency in which the recall requests in the queue 208 are processed. This reordering may include dequeueing a first recall request and requeueing the request in a different position to be processed at a different time. The apparatus 206 may process a first recall request in the queue 208 based upon the status of a second recall request. The status of any recall request may include without limitation, the amount of time the recall request has been in the queue, the position of the recall request in the queue, the mountable media 116 to which the recall request is directed, the physical location of a record containing the data requested by the recall request, whether the recall request has ever been displaced for optimization, the size of the logical volume requested by the recall request, and the like. In one embodiment, the optimizer module 304 may process a first recall request after a second recall request because the status of the second request maybe that it has waited longer to be processed than the first recall request.

In one embodiment, the optimizer module 304 may apply an optimization rule that groups a minimum number of recall requests, corresponding to logical volumes residing on one mountable media 116, sequentially in queue. In another embodiment of the present invention, two recall requests corresponding to logical volumes residing on one mountable media 116 are grouped together such that they are processed sequentially.

By way of example, suppose a mountable media is mounted or loaded in each of tape drives 112a, b, and c (see FIG. 1). In this example, a recall request may be positioned in the queue such that, under a typical "Least Recently Used" processing order, this particular recall request is to be processed after one or more recall requests in the queue. Assuming, for this example, that none of those one or more recall requests in queue are directed to data on a loaded mountable media. The optimizer module 304 may determine that the particular recall request is directed to data on one of the mountable media 116 that is loaded in one of the tape drives 112a, 112b, or 112c. The optimizer module 304 may reorder the queue 208 such that this particular recall request is processed next, before the one or more recall requests already in the queue 208. It will be appreciated by those of skill in the art that grouping one or more recall requests directed to data on a single mounted media, and processing those grouped recall requests sequentially, is more efficient. Grouping recall requests in this manner, regardless of the order in which the recalls where requested, eliminates the need to load and unload a media 116 for each of these grouped recall requests, were they to be processed in their original order.

The optimizer module 304 may apply an optimization rule that requires a minimum number of recall requests, corresponding to a particular logical volume, to be grouped in the queue 208 according to the physical location of at least two recall requests on the mountable media. Logical volumes correspond to physical locations on a particular mountable media. In general, it may be more efficient to access the physical locations on the mountable media 116 in a particular order, instead of jumping from location to location to access the logical volumes. Accordingly, it would be more efficient to group the recall requests, in this example, in an order corresponding to the order in which the matching physical locations are normally accessed.

The optimizer module 304 may group a predetermined maximum number of recall requests sequentially for logical volumes residing on a single mountable media. Once the maximum is reached, the optimizer module 304 would then disregard optimization rules and process the next oldest recall request in the queue 208. The optimizer module may also disregard an optimization rule and process a recall request in the queue 208 when a minimum wait threshold has been reached for that particular recall request. It will be appreciated by those of skill in the art that allowing particular recall requests to be processed ahead of others may provide optimized processing efficiency, but at some point, the requester of the continually bypassed recall may become disenchanted with waiting.

For example, suppose tape drive units 112a, b, and c are loaded with mountable media 116 and the next oldest recall request is directed to a logical volume that is not located on any of these mountable media 116. Suppose further that nine hundred recall requests are behind this next oldest recall request; three hundred for logical volumes loaded on tape drive 112a, three hundred for logical volumes loaded on tape drive 112b, and three hundred for logical volumes loaded on tape drive 112c. It may be most efficient to process the nine-hundred recall requests ahead of the next oldest recall request, however, it could be disadvantageous to make the next oldest recall request wait that long to be processed.

The optimizer module 304 may apply optimization rules that group a minimum number of recall requests in queue 208 by comparing one of the minimum number of recall requests corresponding to a logical volume located on a first mountable media, to a recall request corresponding to a logical volume residing on second mountable media. In the previous example, the next oldest recall request was not in a group associated with recall requests for logical volumes on either tape drive unit 112*a, b*, or *c*. Suppose additional recall requests were added to the queue that were in one of those groups and could be processed while its mountable media were already loaded. The optimizer module 304 can determine the status of the next oldest recall request located on a second or different mountable media than those loaded on the tape drives 112*a, b*, or *c* and refuse to add the newest recall request to any existing group. Additionally, the optimizer module 304 could remove one or more recall requests from a group and process a next oldest non-grouped recall request, or any other recall request, next.

In this configuration, if any recall request has been waiting more than a wait threshold ("long-waiter recall request"), they could be grouped with a recall request processing on a loaded mountable media such that the long-waiter recall request would be processed next. If the long-waiter recall request requires a physical volume, or mountable media, that is not currently loaded, the optimizer module 304 could prohibit a recall request to be grouped with a processing recall request (i.e. disallow optimization) until the long-waiter recall request has been processed. The optimizer module 304 could also remove a recall request that is grouped with a processing recall request to accelerate the processing of the long-waiter recall request. The removed or displaced recall request would then be returned to its original place in the queue 208.

In one embodiment, the optimizer module 304 can also determine whether a minimum number of recall requests for a media 116, or physical volume 116, remain in the queue 208. The optimizer module 304 may determine to complete the processing of the group of recall requests associated with a particular media 116 regardless of the status of any long-waiters. In one embodiment, the minimum number of recall requests in a group remaining to be processed on particular physical volume 116 in order to override or ignore long-waiter recall requests is one. In another embodiment, a maximum of two recall requests, left in the group to be processed, is allowable before a long-waiter recall request can be considered.

In one particular embodiment, an optimization rule can be determined by a mathematical algorithm and be automatically applied if the parameters of the mathematical algorithm are met. In one embodiment, the mathematical algorithm may be linear. In another embodiment, the mathematical algorithm may be non-linear. In this configuration, a user of the system may determine where to set a threshold for the period of time a particular recall request waits to be processed. The user may also determine how many recall requests are to be grouped together and processed sequentially from any one media 116. This user-defined parameter for any recall request status may be implemented by software or hardware. For example, the system 100 or apparatus 206 may include a knob, switch, or the like, which can be used to raise or lower the wait threshold for any recall request that has not been grouped for optimization. The hardware switch could employ software using linear or nonlinear algorithms to apply the threshold set by the user via the hardware.

As discussed above, the modules for receiving a plurality of recall requests, placing each recall request in a queue for processing, reordering the queue in accordance with at least one optimization rule, and/or processing a first recall request based upon the status of a second recall request, could be implemented by hardware, firmware, software, or the like, or any combination thereof. These and other means for receiving, queuing and optimizing can recall requests could be implemented to practice the teachings of this invention.

It will be appreciated that additional optimization rules could be applied to the processing of recall requests which could reorder the recall requests in the queue 208. These and other such optimization rules could increase efficiency, practicality, or utility and fall within the scope of this invention. It will further be appreciated that these and other optimization rules could be applied singly or in combination to practice the teachings of this invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
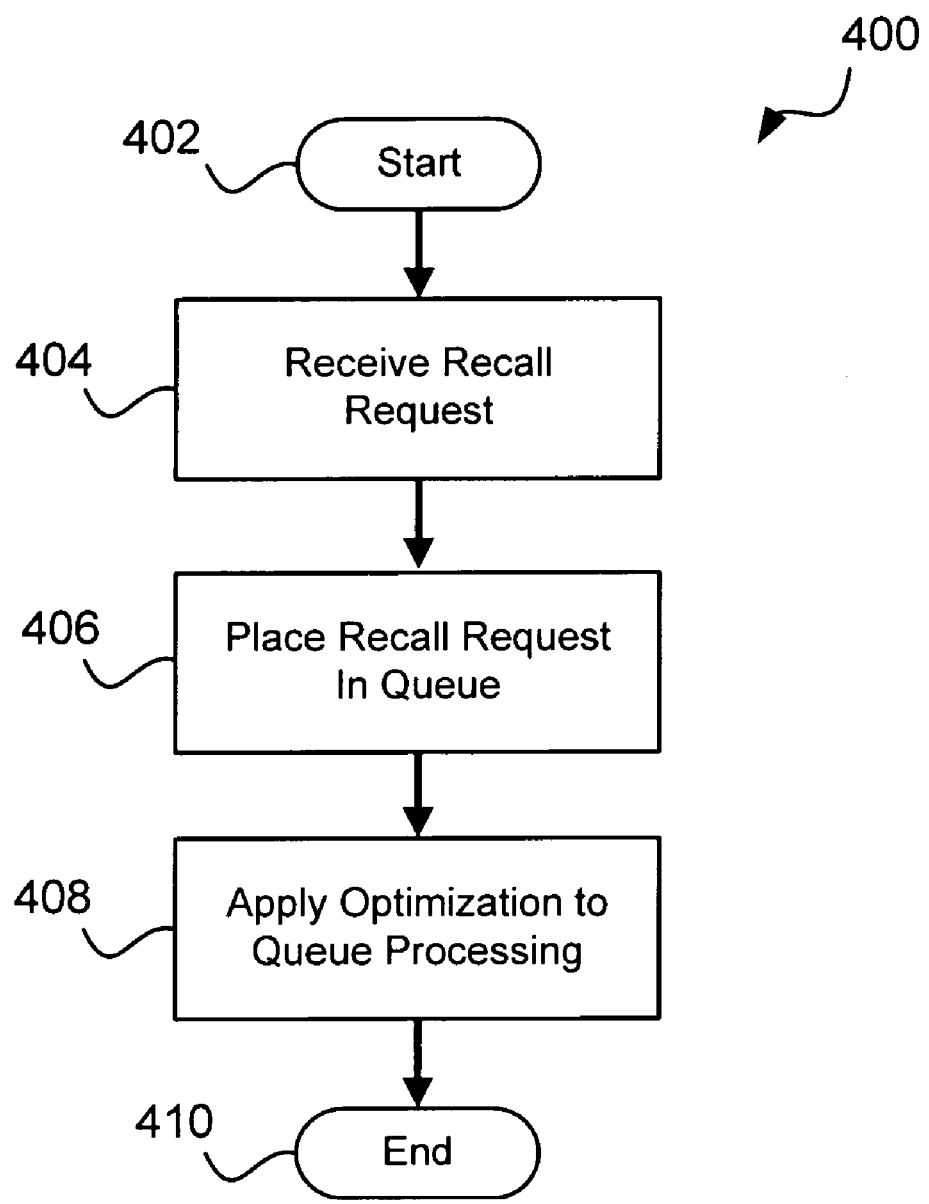
FIG. 4 is a schematic flow chart diagram illustrating one embodiment of a method for recalling a logical volume that may be implemented on the virtual tape system of FIG. 1.

FIG. 4 illustrates a schematic flow chart diagram illustrating one embodiment of a method 400 for recalling a logical volume that may be facilitated by the automated storage manager apparatus 206 of FIG. 3. The method starts 402 by receiving 404 a plurality of recall requests from the processor 225. Each recall request is directed to a logical volume stored in a mountable media 116 (FIG. 1). The recall requests are placed 406 in a queue 208 (FIG. 3) for processing. At least one optimization rule is applied 408 to the queue to optimize the processing of the recall requests. This could lead to a reordering of the recall requests in the queue 208. The applying step 408 may include processing a first recall request based upon a status of a second recall request. The status of any recall request may include without limitation, the amount of time the recall request has been in the queue, the position of the recall request in the queue, the mountable media 116 to which the recall request is directed, the physical location of a record containing the data requested by the recall request, whether the recall request has ever been displaced for optimization, the size of the logical volume requested by the recall request, and the like. The applying step 408 may also include grouping a minimum number of recall requests sequentially in queue where the minimum number of recall requests corresponds to a logical volume residing on a single mountable media. The applying step 408 may also include applying an optimization rule that groups a maximum number of recall requests sequentially in queue where the maximum number of recall requests corresponds to a logical volume residing on a single mountable media. The applying step 408 may also include deciding not to apply any optimization rules at all, or under certain conditions. The queue 208 may receive 404 additional recall requests that are placed 406 in the queue. For each recall request in queue, the apparatus 206 determines whether and how to apply 408 optimization rules. When there are no more recall requests in the queue 208, the process ends 410. Examples of the applying step 408 are set forth above.

A signal bearing medium is also presented to store a program that, when executed, performs one or more operations to recall logical volumes from mountable media. In one embodiment, the operations include performing the method steps outlined above. In another embodiment, the program performs an operation to reorder the queue in accordance with at least one optimization rule. The program could execute instructions that group a minimum number of recall requests corresponding to a particular logical volume according to a physical location of at least two recall requests on the mountable media. The program could also execute instructions to group a minimum number of recall requests in the queue 208 by comparing one of the minimum number of recall requests corresponding to a logical volume located on a first mountable media 116, to a recall request corresponding to a logical volume residing on a second mountable media 116. The program could also execute instructions to disregard one or more optimization rules under a number of circumstances. These circumstances include, but are not limited to a particular recall request waiting longer than a wait threshold to be processed.

Figure 5:
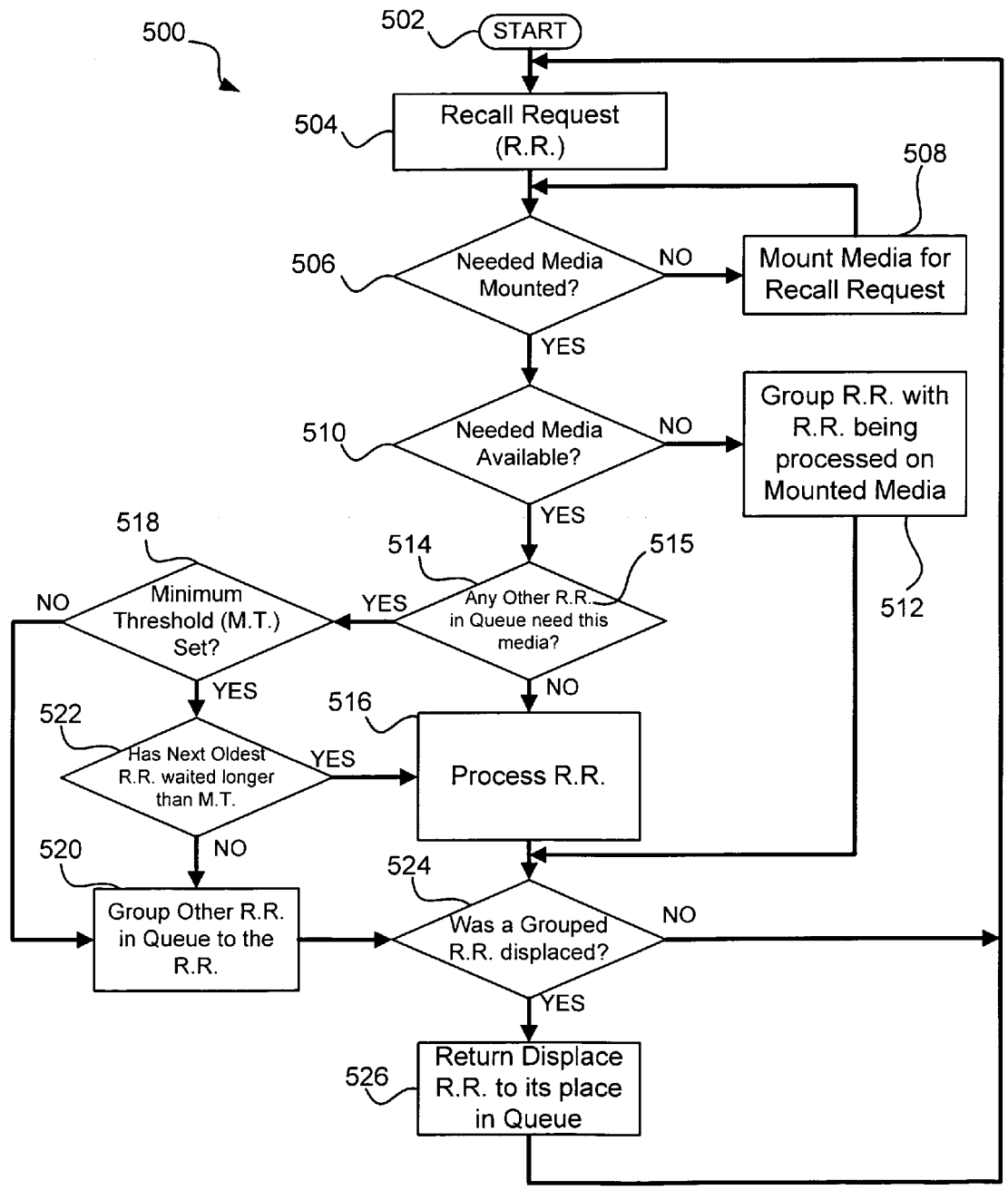
FIG. 5 is a schematic flow chart diagram illustrating one embodiment of a method for recalling a logical volume that may be implemented on the virtual tape system of FIG. 1.

FIG. 5 depicts one embodiment of a recall request method 500 that is given by way of example of more detailed operations that may occur in conjunction with the recall request method of FIG. 4. In this embodiment, the method starts with a recall request 504 for a logical volume stored on a mountable media 116. The automated storage manager 206 determines 506 whether the media 116 upon which the logical volume resides is already mounted to an accessible drive 112*a*, *b*, or *c*. If it isn't, the media containing the recall request 504 can be mounted 508. If it is, the automated storage manager 206 determines 510 whether the needed media is available. The mounted media 116 may not be available for the recall request 506, for example, if another recall request is processing on that media. If the media is not yet available, the recall request 504 is grouped or chained 512 to the recall request being processed on that media 116 so that it is next to be processed on the mounted media 116.

If the media is mounted and available the automated storage manager 206 determines 514 if there are any other recall requests in the queue 208 that need this media 116. If not, the recall request is processed 516. If there are other recall requests 515 in the queue 208 that need this same media as recall request 506, the automated storage manager 206 determines 518 whether a minimum wait threshold has been set. If a minimum threshold has not been set, this second or other recall request 515 is grouped 520 with recall request 504 for more efficient processing on the mounted media 116. If there a minimum wait threshold has been set, the automated storage manager 206 determines 522 whether the next oldest recall request has waited longer than the minimum wait threshold. If it has, recall request 504 is processed 516 and the other recall request 515 in the queue that needs the same mounted media 116 as recall request 504 is not grouped with recall request 504 to allow the long-waiter to process ahead of the other recall request 515. If the minimum wait threshold has not been met, or in other words, if the next oldest recall request has not waited longer than the predetermined minimum wait threshold, the other recall request 515 is grouped 520 with recall request 504 for more efficient processing on the mounted media 116.

If any recall request is displaced 524 while processing other recall requests, it is returned 526 to its place in the queue 208. This scenario may happen if a recall request has been grouped with a recall request that is processing, but before the grouped or chained recall request is processed, it is determined that a long-waiter is in the queue 208. At this point, once the processing recall request is finished, the grouped recall request may be returned to the queue 208. The media needed for the long-waiter recall request may then be mounted to allow the long-waiter recall request to be processed.

Figure 6A:
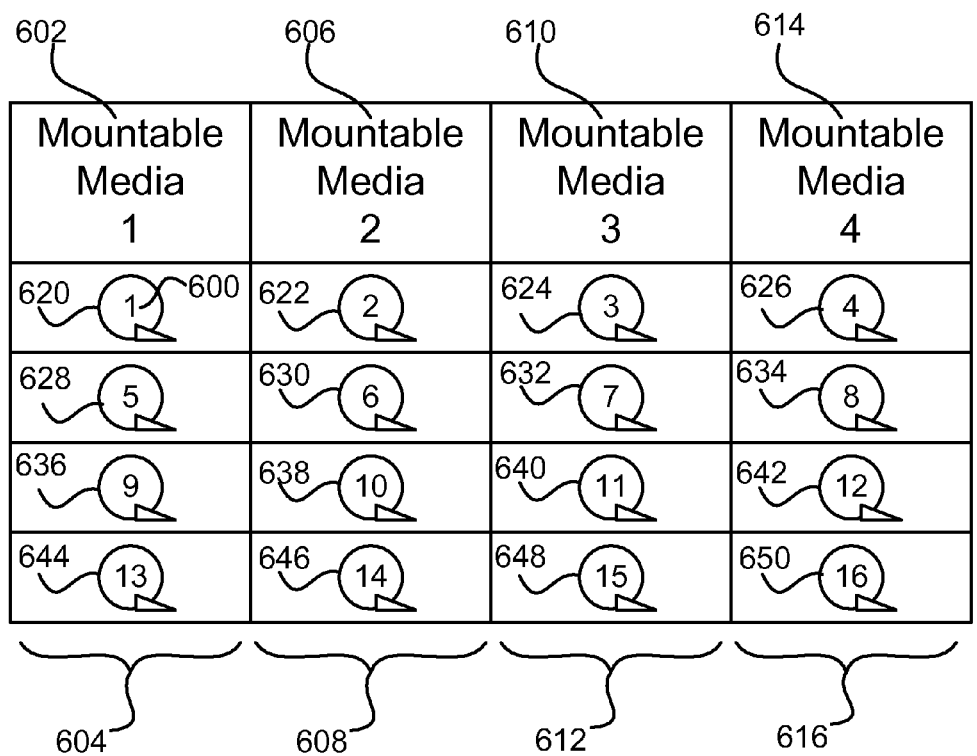
FIGS. 6 and 6a are schematic block diagrams illustrating one advantage that could be realized by the virtual tape system of FIG. 1, in accordance with the present invention.
Figure 6B:
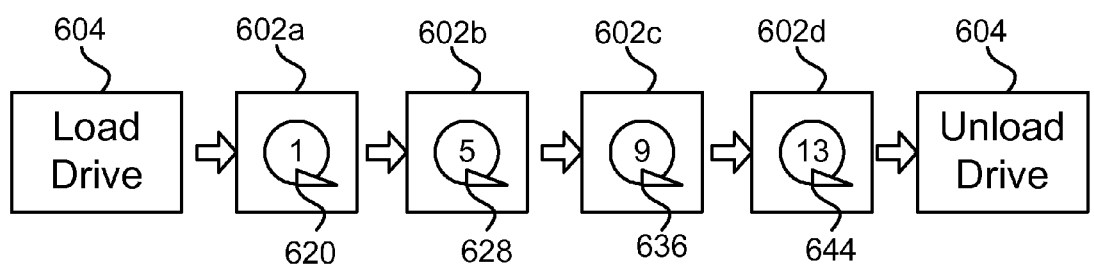

FIGS. 6*a* and 6*b* illustrate one of the advantages of the method of FIG. 5. In the example illustrated in FIG. 6*a*, a mountable media 602 is mounted in drive 604, a mountable media 606 is mounted in drive 608, a mountable media 610 is mounted in drive 612, and a mountable media 614 is mounted in drive 616. In the illustrated example, mountable media 604 contains logical volumes 620, 628, 636, and 644. Mountable media 606 contains logical volumes 622, 630, 638, and 646. Mountable media 610 contains logical volumes 624, 632, 640, and 648. Mountable media 614 contains logical volumes 626, 634, 642, and 650. Each logical volume is requested in a particular order and is associated with a request number 600.

A typical VTS may have a small number of drive units that can be used for recalling logical volumes from mountable media such as a tape cartridge. In the example illustrated in FIG. 6*a*, four drive units 604, 608, 612, and 616 are shown. A standard VTS may have more virtual devices that provide access to the logical volumes. As stated above, there are times on a VTS where more virtual devices access logical volumes that are not in cache than there are physical drives to mount the physical mountable media. When this occurs, the additional recall requests are placed in a queue for processing. In standard VTSes, this usually takes place on a first in-first out basis. Often these queued recall requests arrive in an order that, when processed in a first in-first out order, require a media unload and load cycle for each logical volume recalled.

In a conventional VTS, request number 1 would be directed to the mountable media on which the subject matter of the recall request resides. In the illustrated example it is mountable media 602 loaded on drive 604. Similarly, request number 2 would be directed to a mountable media 606 loaded on the next available drive 608. Likewise, Request number 3 would be directed to a mountable media 610 and loaded on the next available drive 612. Finally, request number 4 directed to a logical volume on mountable media 614 would cause mountable media 614 to be loaded onto drive 616, and the drive units 604, 608, 612, and 616 would be full. In a conventional VTS, request number 5 would be processed next and then request number 6. However, if request number 6 is not on mountable media 606, mountable media 606 would be unloaded and the mountable media containing the logical volume 630 to which request number 6 is directed would be loaded. Similarly, if there were only one drive, every request in a conventional VTS could require a load/unload cycle. Loading and unloading takes time.

FIG. 6*b* illustrates a processing order according to the present invention, where requests 1, 5, 9, and 13 are associated with logical volumes 620, 628, 636, and 644 located on mountable media 602, which is loaded on drive 604. In this embodiment, these requests are processed together. Upon completion of the first group, requests 2, 6, 19, and 14 are processed as a group followed by the group containing recall request 3, 7, 11, and 15. Finally, recall requests 4, 8, 12, and 16 are processes. In this configuration, time consuming load/unload cycles are avoided. The time necessary to load and unload a drive unit over multiple recall requests is in essence amortized over several recall requests for a time savings of several minutes.

Figure 7:
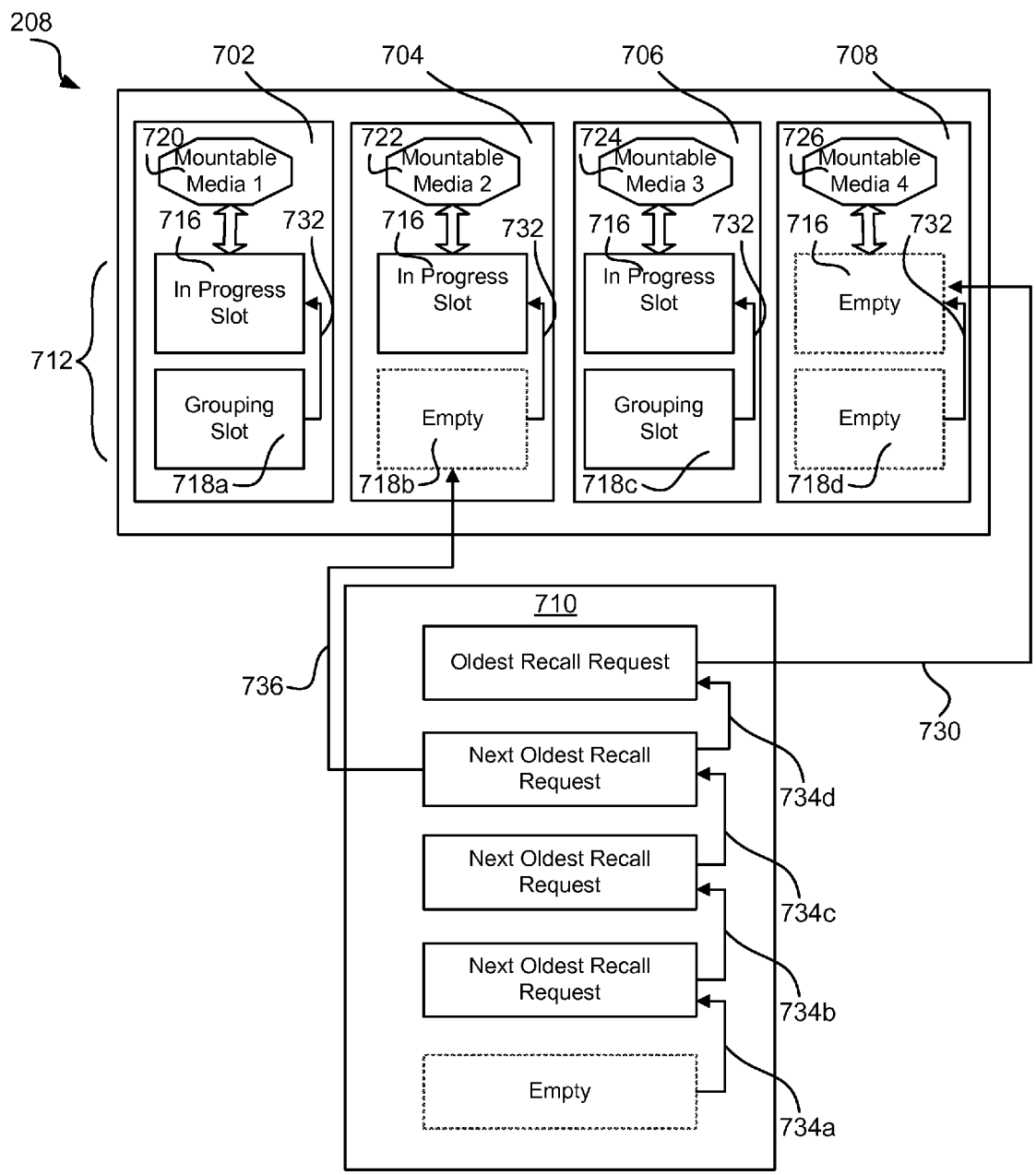
FIG. 7 is a schematic block diagram illustrating one embodiment of a process according to the present invention.

FIG. 7 illustrates one embodiment of the method of the invention in a VTS system having 4 drive units 702, 704, 706, and 708. In this embodiment, the queue 208 is subdivided into a recall queue 710 and a grouping queue 712 for each of the drive slots 702, 704, 706, and 708. The grouping queue 712 is configured with an "in-progress" slot 716 and one or more grouping slots 718. The number of grouping slots depends upon the number of recall requests to be grouped together. Each in-progress slot 716 is associated with a drive 702, 704, 706, and 708 to which a respective mountable media 720, 722, 724, and 726, is attached. The in-progress slot represents the recall request being processed on its respective drive unit 702, 704, 706, and 708. The grouped slot represents the next recall request that will be issued to the mountable media loaded in the respective drive unit 702, 704, 706, and 708. The two slots 716, 718 associated with each drive unit 702, 704, 706, and 708 form a two-level queue associated with each loaded mountable media 702, 704, 706, and 708. The recall queue 710 holds the requested recalls that are not in a grouping queue 712, in order of receipt from a user.

When a recall request is received, it goes into the recall queue 710. If no entries are in an in-progress slot 716, and no entries are in the recall queue 710, the recall request is placed in an available in-progress slot. It will be appreciated that in certain embodiments, the recall request can go directly into the empty in-progress slot. Periodically, recalls will complete and commands will be sent to remove the corresponding recall request for the logical volume that is now recalled. As recall requests come in, they are added to the recall queue 710.

When the recall queue 710 is processed, both the in-progress slots 716 and the grouping slots 718 are processed. To process the oldest recall request in queue 710, the automated storage manager 206 determines if any in-progress slots 716 are empty and whether there is an entry in the grouping slot 718 associated with that particular in-progress slot 716. If there is an empty in-progress slot (perhaps because the recall request that was there has finished processing) the grouping slot entry is moved 732 to its associated in-progress slot.

When grouping slots become available, the apparatus 206 of the present invention determines whether conditions for optimization have been met. If they have, optimization of entries in the recall queue 710 can occur. If optimization conditions have not been met, the next oldest recall request is placed 730 in the next available in-progress slot 716. It will be appreciated that the once that first "oldest recall request" is processed, all the entries in the recall queue 710 are a version of a "next oldest request." As each next oldest request is processed, the queue of next oldest request advances 734 until it becomes the current oldest request or oldest of the next oldest recall requests. The optimization conditions or rules are in place to prevent the delay of processing recall requests that cannot be optimized for excessive periods of time.

The automated storage manager 206 scans the in-progress slots 716 for entries that do not have recall request in the associated grouping slot 718. If there is one, and optimization is allowed, it will scan the recall queue 710 for the longest waiting next oldest recall request that needs the same mountable media as the selected in-progress recall request. If the automated storage manager 206 finds one, it will move 736 it to the appropriate grouping slot 718. The processing of the recall queue 710 continues for a predetermined amount of logical volumes have been processed or no more logical volumes can be processed. It is activated whenever a recall request is issued, a requested recall finishes, or periodically as required.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for recalling logical volumes, the apparatus comprising:
    a receiving module comprising executable code stored on a storage device, executed by a processor, and configured to receive at least one recall request, each recall request being directed to a logical volume stored in a mountable media;
    a queuing module comprising executable code stored on the storage device, executed by the processor, and configured to place each recall request in a queue for processing; and
    an optimizer module comprising executable code stored on the storage device, executed by the processor, and configured to reorder the queue in accordance with at least one optimization rule, wherein the at least one optimization rule comprises grouping at least two recall requests sequentially in the queue, each of the at least two recall requests corresponding to a logical volume residing on a single mountable media and processing a first recall request based upon a status of a second recall request such that the first recall request is processed after the second recall request if the second recall request is previously displaced by reordering.

2. The apparatus of claim 1, wherein the at least two recall requests corresponding to a particular mountable media are grouped in queue according to a physical location of at least two recall requests on the mountable media.

3. The apparatus of claim 1, wherein grouping the at least two recall requests in queue comprises comparing one of the at least two recall requests corresponding to a logical volume located on a first mountable media, to a recall request corresponding to a logical volume residing on second mountable media.

4. The apparatus of claim 1, wherein the optimization rule comprises grouping at most nine hundred and one recall requests sequentially in queue, each of the at most nine hundred and one recall requests corresponding to a logical volume residing on a single mountable media.

5. The apparatus of claim 1, wherein at least one optimization rule is determined by a mathematical algorithm.

6. The apparatus of claim 5, wherein the mathematical algorithm is linear.

7. The apparatus of claim 5, wherein the mathematical algorithm is nonlinear.

8. An apparatus for recalling logical volumes, the apparatus comprising:
    a receiving module comprising executable code stored on a storage device, executed by a processor, and configured to receive a plurality of recall requests, each recall request being directed to a logical volume stored in a mountable media;
    a queuing module comprising executable code stored on the storage device, executed by the processor, and configured to place each recall request in a queue for processing; and
    an optimizer module comprising executable code stored on the storage device, executed by the processor, and configured to reorder a first recall request in the queue based upon a status of a second recall request such that the first recall request is processed after the second recall request if the second recall request is previously displaced by reordering.

9. The apparatus of claim 8, wherein the optimizer module groups the first recall request with the second recall request when both requests are for logical volumes residing on the same mountable media.

10. The apparatus of claim 8, wherein the optimizer module is configured to process a first recall request before a second recall request when the first recall request has waited for a minimum wait threshold.

11. A system to recall logical volumes, the system comprising:
   at least one drive unit configured to receive a mountable media containing at least one logical volume;
   a tape library operably connected to the drive unit for providing a mountable media to the drive unit;
   a cache configured to store a logical volume received from the mountable media; and
   a memory containing modules for execution on a processor, the modules comprising:
      a receiving module configured to receive a plurality of recall requests, each recall request being directed to a logical volume stored on the mountable media;
      a queuing module configured to place each recall request in a queue for processing; and
      an optimizer module configured to reorder the queue in accordance with at least one optimization rule, wherein the at least one optimization rule comprises grouping at least two recall requests sequentially in the queue, each of the at least two recall requests corresponding to a logical volume residing on a single mountable media and processing a first recall request based upon a status of a second recall request such that the first recall request is processed after the second recall request if the second recall request is previously displaced by reordering.

12. A program of machine-readable instructions stored on a storage device and executable by a digital processing apparatus to perform an operation to recall logical volumes from mountable media, the operation comprising:
   receiving a plurality of recall requests, each recall request being directed to a logical volume stored in a mountable media;
   placing each recall request in a queue for processing; and
   reordering the queue in accordance with at least one optimization rule, wherein the at least one optimization rule comprises grouping at least two recall requests sequentially in the queue, each of the at least two recall requests corresponding to a logical volume residing on a single mountable media and processing a first recall request based upon a status of a second recall request such that the first recall request is processed after the second recall request if the second recall request is previously displaced by reordering.

13. The program of machine-readable instructions of claim 12, wherein the instructions further comprise grouping the at least two recall requests corresponding to a particular mountable media according to a physical location of the at least two recall requests on the mountable media.

14. The program of machine-readable instructions of claim 12, wherein the instructions further comprise grouping the at least two recall requests in the queue by comparing one of the at least two recall requests corresponding to a logical volume located on a first mountable media to a recall request corresponding to a logical volume residing on second mountable media.

15. A method for recalling logical volumes, the method comprising:
   receiving a plurality of recall requests, each recall request being directed to a logical volume stored in a mountable media;
   placing each recall request in a queue for processing; and
   applying at least one optimization rule to reorder recall requests in queue for processing, wherein the at least one optimization rule comprises grouping at least two recall requests sequentially in the queue, each of the at least two recall requests corresponding to a logical volume residing on a single mountable media and processing a first recall request based upon a status of a second recall request such that the first recall request is processed after the second recall request if the second recall request is previously displaced by reordering.

16. An apparatus to recall logical volumes from a mountable media, the apparatus comprising:
   means for receiving a plurality of recall requests, each recall request being directed to a logical volume stored in a mountable media;
   means for placing each recall request in a queue for processing; and
   means for reordering the queue in accordance with at least one optimization rule, wherein the at least one optimization rule comprises grouping at least two recall requests sequentially in the queue, each of the at least two recall requests corresponding to a logical volume residing on a single mountable media and processing a first recall request based upon a status of a second recall request such that the first recall request is processed after the second recall request if the second recall request is previously displaced by reordering.

* * * * *